April 26, 1938.  A. H. HAUPT  2,115,105
METHOD OF AND APPARATUS FOR FORMING PLASTIC CYLINDERS
Filed Oct. 13, 1936  2 Sheets-Sheet 1

Albertus Hendrik Haupt INVENTOR
BY
ATTORNEY

Patented Apr. 26, 1938

2,115,105

UNITED STATES PATENT OFFICE 2,115,105

METHOD OF AND APPARATUS FOR FORMING PLASTIC CYLINDERS

Albertus Hendrik Haupt, Somerset West, Cape Province, Union of South Africa, assignor to Imperial Chemical Industries Limited, a corporation of Great Britain Application October 13, 1936, Serial No. 105,429
In Great Britain October 21, 1935

25 Claims. (Cl. 93—2)

This invention relates to an improved method and apparatus for preparing cylinders of predetermined length and diameter of gelatinous or plastic material, particularly of gelatinous or plastic blasting explosive. The invention also relates to an improved method and apparatus for wrapping cylindrical objects and particularly cylinders of plastic or gelatinous material.

According to the invention a method of forming cylinders of plastic material to a predetermined length and diameter includes the steps of extruding a length of such material, feeding the said length to a position where it is held between a number of co-operating rollers one of which is in the form of a drum and is of relatively large diameter compared with the others, rolling out the said length between the rollers to the required diameter, cutting it to the required length by means of cutting devices mounted on or near the periphery of the drum, and discharging the formed cylinder from the operating position.

According to a further feature of the invention the cylinder, after it has been rolled out and cut to the required dimensions, is wrapped while still held in the operating position by feeding thereto a sheet of wrapping material and rotating the cylinder in the operating position until wrapping has been completed. The ends of the wrapped article may then be closed by means of crimping and tapping devices mounted on or near the periphery of the drum. The cylinder of plastic material is preferably introduced into and released from the operating position by means of suitably shaped recesses formed peripherally on the drum.

The invention also includes apparatus for forming cylinders of plastic material to a predetermined length and diameter comprising a number of co-operating rollers one of which is in the form of a drum and is of relatively large diameter compared with the others, means for extruding a length of the plastic material and for feeding it to an operating position where it is held between the rollers and rotated thereby, a cutting device mounted peripherally on the drum and adapted to be brought into operation after the cylinder has been rolled out to the required diameter, and means for discharging the formed cylinder from the operating position.

The invention also includes apparatus for wrapping cylindrical articles comprising a plurality of co-operating rollers one of which is in the form of a drum and is of relatively large diameter compared with the others, means for feeding the article into position where it is held between the co-operating rollers and rotated thereby, means for feeding a sheet of wrapping material to a position between the article and one of the confining rollers and means for discharging the wrapped article from the operating position.

According to the preferred form of the present invention cylinders of plastic material are reduced to a predetermined length and diameter and wrapped by a method comprising the following steps. There is first extruded a continuous cylinder or rod of the material exceeding slightly in diameter the diameter of the desired final article from the nozzle of an extruding machine across a shelf or platform, on one side of which away from the nozzle of the extruding machine is a fixed blade or knife, the cylinder being sheared in two places at a suitable distance apart by knives attached on either side of a revolving drum located beneath said shelf, one of which knives passes the nozzle of the extruding machine and the other of which passes the fixed knife on the shelf, after the manner described in U. S. application Serial No. 34,822. Thereafter the sheared-off portion or cylinder of plastic material (hereinafter referred to as "the cylindrical article") is propelled on to the said revolving drum where it is received in a gap of suitable shape, which is provided by cutting away a portion of the periphery of the drum, and is carried onwards by the motion of the revolving drum until it strikes a suitably positioned fixed stop or stops and is caused thereby to rise out of the gap on to the periphery of the drum and to become confined between the periphery of the drum and two suitably positioned superposed revolving rollers. The said stop or stops are located or operate in circumferential grooves provided in the peripheries of the drum and of one of the rollers. The drum and the two rollers are so placed in relation to one another that the cylindrical article is rolled out between them to the desired final diameter, resulting in its length being correspondingly increased, while the surplus material thus produced at each end of the rolled out cylindrical article is cut off by means of two further knives attached to the sides of the drum so that the final cylinder is of the desired length and diameter. Thereafter a sheet of paper or other suitable wrapping material, cut somewhat greater in width than the length of the cylindrical article to be wrapped, is fed between the drum and the cylindrical article, which sheet of paper or other wrapping material by the motion of the drum and of the two confining rollers and of the cylindrical article itself is wrapped round the cylindrical article. The portions of the wrapping sheet which project beyond the ends of the cylindrical article are caused to be crimped or folded in and closed by means of suitable crimping and tamping devices, after which the finished wrapped cylindrical article is released or expelled from the apparatus by falling into another suitably shaped gap in the periphery of the revolving drum, provided by cutting away another portion of the periphery thereof, from which gap the wrapped article is discharged by gravity. The cycle of operations above described is then repeated thereby providing continuous production of the sized and wrapped articles.

It is important that the wrapping material should be fed between the drum and the cylindrical article to be wrapped in correct alignment with the axes of the rollers and of the cylindrical article and that the moment of delivery should be accurately synchronized in relationship to the positioning of the cylindrical article so that the sheet of wrapping material is fed between the drum and the cylindrical article after the latter has been rotated sufficiently to reduce its diameter to the desired size and has had its projecting ends sheared off so as to reduce it to the desired length.

One form of the invention is described in relation to the accompanying drawings in which:—

Figure 1:
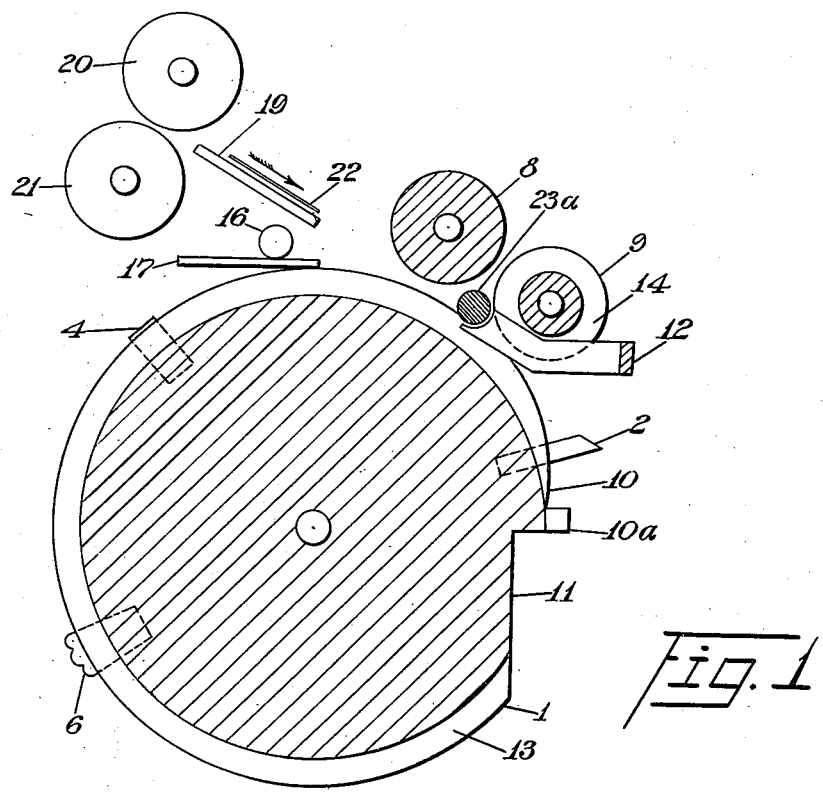
Figure 1 is a diagrammatic sectional elevation of the apparatus.

A drum 1, made to revolve at a suitable constant speed in a clockwise direction on a shaft 32, has fixed to its sides knives 2, and 3, secondary knives 4 and 5 and crimpers 6 and 7, all of which project beyond the periphery of the drum. The blades of the knives 2 and 3 are of sufficient length to project beyond the shelf 17, hereinafter referred to, and to shear the rod or cylinder of plastic material thereon. The secondary knives 4 and 5 and the crimpers 6 and 7 are shorter than the knives 2 and 3 so that they do not contact with the rod or cylinder of plastic material 16 as it is extruded from the nozzle 15 across the shelf 17.

Rollers 8 and 9 are made to rotate at a constant speed such that their peripheral speed is the same as or greater than the peripheral speed of the drum 1.

These rollers 8 and 9 are fixed in relation to the drum 1 in such positions that a cylinder confined between the peripheries of the drum 1 and of the rollers 8 and 9 is of the desired diameter of the final cylindrical wrapped article.

A portion of the periphery of the drum 1 is cut away as shown at 10 so as to leave a projecting stop or stops 10a and another portion is cut away as shown at 11.

A groove 13 is provided in the drum 1 and a similar groove 14 in roller 9. These grooves accommodate a stop 12, which is fixed in relation to the positions of the drum 1 and the rollers 8 and 9 so as to stop the cylindrical article at the appropriate position and cause it to rise on to the periphery of the drum and come into confining relationship with the peripheries of the drum and the rollers 8 and 9. The end of stop 12 is preferably shaped in a curve to approximately conform with the curvature of the cylindrical article. In place of one stop two or more may be used, in which case a corresponding number of grooves must be provided in the drum 1 and roller 9.

The nozzle only of an extruding machine is shown at 15, the end of the rod or cylinder of plastic material being continuously extruded is shown at 16, resting on a shelf 17.

An upright knife 18 is fixed in a suitable position on the shelf 17.

Cutting rolls 20 and 21 cut the paper or other wrapping material, as described in U. S. Patent No. 2,026,533, and propel the cut wrapping material 22 forward on to the guide or chute 19 at the appropriate time. Whilst this means of cutting and feeding the sheets of wrapping material is particularly suitable, we do not confine ourselves thereto. Other suitable means may be used, e. g. ready cut sheets of wrapping material may be placed on the chute 19 at appropriate intervals.

Figure 2:
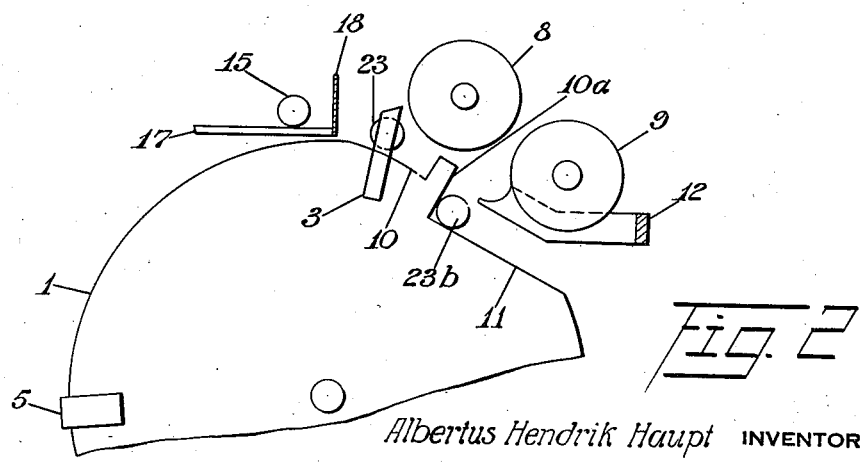
Figure 2 is a diagrammatic elevation of part of the apparatus.

In Figure 2 is shown a cut-off portion of plastic blasting explosive or other plastic material 23, which has been sheared from the extruded continuous cylinder 16 by the passage of the knife 2 past the nozzle 15 and, at another place, by the passage of the knife 3 past the fixed knife 18. The knives 2 and 3 by their motion, drag or propel the cut-off portion 23 from the shelf 17 so that it rests on the gap 10 in the periphery of the drum 1.

The cut-off portion 23 is then carried, by the motion of the drum 1 and the knives 2 and 3, under the roller 8 and against the stop 12.

Further movement of the drum 1 raises the cylinder 23 on to the periphery of the drum into the position shown as 23a in Figure 1.

The further rotation of the drum 1 and of the rollers 8 and 9 causes rotation of the cylinder 23a and rolls it out to the desired diameter, its length being thereby increased.

Further rotation of the drum 1 brings the secondary knives 4 and 5 past the rolled out cylinder 23a whereby the projecting ends of the cylinder 23a are cut off, after which the cylinder 23a is of the desired dimensions in respect both of length and of diameter.

The cut-off piece of paper or other wrapping material 22 is now delivered between the drum 1 and the roller 8 so that it passes under the cylinder 23a. The wrapping material must be fed between the drum and the cylindrical article to be wrapped in correct alignment with the axes of the rollers and of the cylindrical article and the moment of delivery must be accurately synchronized in relationship to the positioning of the cylindrical article so that the sheet of wrapping material is fed between the drum and the cylindrical article after the latter has been reduced to the final desired diameter and has had its projecting ends sheared off so as to reduce it to the desired length. The rotation of the drum 1 and the cylinder 23a moves the paper or other wrapping material up against the stop 12 whereby the leading edge of the paper is forced up between the cylinder 23a and the roller 9 so that the paper is partially wrapped round the cylinder 23a. Further rotation of the drum 1, the cylinder 23a and the rollers 9 and 8 complete the process of wrapping.

The paper or other wrapping material is cut wider than the length of the cylinder 23a so that the edges of the wrapping material, after wrapping, project beyond the ends of the cylinder 23a.

Further rotation of the drum 1 brings the crimpers 6 and 7 past the ends of the wrapped cylinder so that the end flaps of the wrapping material are folded in.

Figure 3:
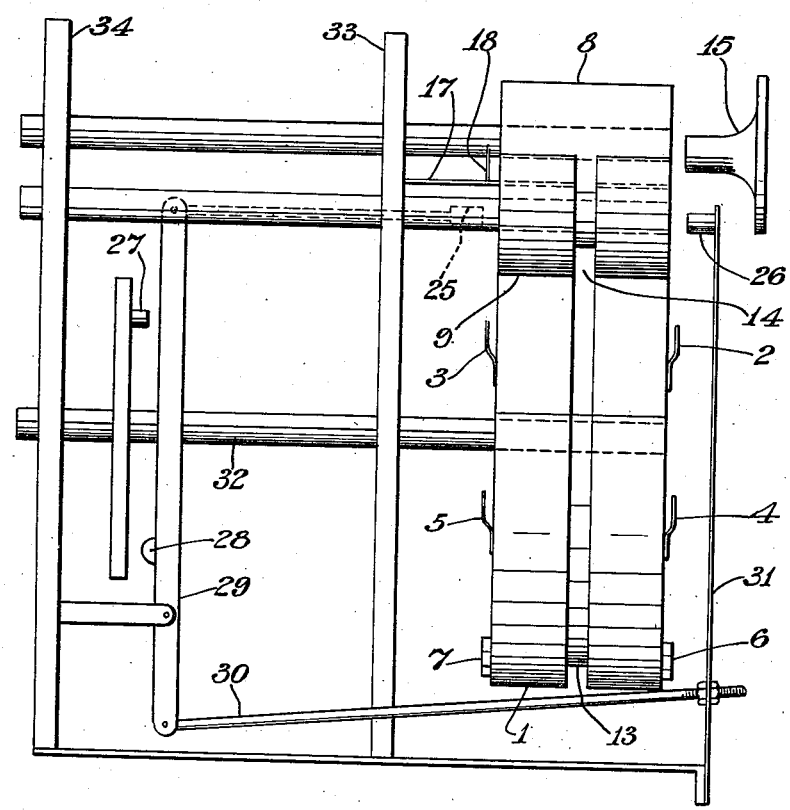
Figure 3 is a diagrammatic end elevation of the apparatus.

When the crimping is completed the folded in ends are compressed by tampers 25 and 26 which are operated at the appropriate time by means of the cam 27, shown in Figure 3 as being fixed to the shaft 32 to which the drum 1 is attached, striking the knob or projection 28 on the lever 29, the movement being imparted to the tampers 25 and 26 by the link motion 29, 30 and 31.

The lever 31 is shown as a spring but other suitable arrangements, such as an articulated lever, may be used if desired.

Further rotation of the drum 1 brings the gap 11 in the periphery of the drum under the finished wrapped cylinder 23a, which falls by gravity into the gap 11 to the position shown as 23b, and, being clear of the stop 12, further rotation of the drum 1 carries the cylinder 23b forward until it rolls out of the gap 11 by gravity and is discharged from the machine.

In the meantime another cut-off cylinder of plastic material is being carried to the position shown as 23a and the sequence of operations is repeated.

33 and 34 in Figure 3 are frame members holding together the various portions of the apparatus.

I claim:—

1. Apparatus for forming cylinders of plastic material to a predetermined length and diameter comprising a number of co-operating rollers one of which is in the form of a drum and is of relatively large diameter compared with the others, means for extruding a length of the plastic material and for feeding it to an operating position where it is held between the rollers and rotated thereby, a cutting device mounted peripherally on the drum and adapted to be brought into operation after the cylinder has been rolled out to the required diameter, and means for discharging the formed cylinder from the operating position.

2. Apparatus as claimed in claim 1 and comprising a rotatably mounted drum in superposed relation to which are rotatably mounted two relatively smaller rollers, said drum being provided on or adjacent its periphery with means for shearing off a length of extruded plastic material, means for delivering said sheared off length into a peripheral delivery depression, a stop associated with the rollers and co-acting with said peripheral delivery depression for raising said sheared off length into confining relationship between said rollers and the circular periphery of the drum, knives fixed to opposite sides of the drum for cutting off excess material at each end of the rolled out cylinder, and a peripheral discharge depression in the drum for permitting the finished cylinder to drop out of said confining relationship and fall clear of the apparatus, the said peripheral devices being successively brought into operation by reason of rotation of the drum.

3. A method of forming a cylinder of plastic material to a predetermined length and diameter which comprises extruding a continuous cylinder or rod of the material exceeding slightly in diameter the diameter of the desired final article, shearing a portion thereof from the continuous rod, propelling the sheared off portion into rotating position, rotating the cylinder until the predetermined diameter is attained, cutting off the ends to conform to the predetermined length and discharging the cylinder from the operating position.

4. The method of claim 3 in which a sheet of wrapping material is fed into position about the cylinder of plastic material, rotating the cylinder until the wrapping is complete, and folding in the projecting ends of the wrapping material.

5. A method of forming cylinders of plastic material to a predetermined length and diameter which comprises extruding a continuous rod of the material, cutting a piece therefrom, feeding said piece of material to a position where it is held between a number of parallel rotating rollers situated close together of which one comprises a drum and has a relatively large diameter compared with the others, rolling out the length between the rollers to predetermined diameter, cutting the material to predetermined length by means of cutting devices mounted about the periphery of the drum, and discharging it from the operating position.

6. The method of claim 5 in which the portion of plastic material is fed on to the upper half of the periphery of the drum, and transferring the portion of plastic material by rotation of the drum on to the rollers mounted in superposed relationship to the drum.

7. A method of forming cylinders of plastic material to a predetermined length and diameter and wrapping the formed cylinder which comprises cutting a piece from a continuous rod of the material, feeding said piece of material to a position where it is held between a number of parallel rotating rollers situated close together of which one comprises a drum and has a relatively large diameter compared with the others, rolling out the length between the rollers to predetermined diameter, cutting the material to predetermined length by means of cutting devices mounted about the periphery of the drum, wrapping the formed cylinder and discharging it from the operating position.

8. The method of claim 7 in which a sheet of wrapping material is fed into a position between the cylinder of plastic material and one of the rollers while the cylinder is confined between the rollers, and rotating the cylinder until the wrapping is completed.

9. An apparatus for forming cylindrical articles of plastic material, comprising a plurality of rollers situated close to each other and rotatable in the same manner, one of said rollers comprising a drum and relatively large in diameter compared with the others, means for cutting off a portion of a rod of the material, means for feeding the cut-off portion into position between the rollers, a cutting means mounted peripherally on the drum and adapted to be brought into operation after the cylinder has been rolled out to a predetermined diameter, and means for discharging the sized cylinder from the operating position.

10. The apparatus of claim 9 in which two small rollers cooperate with the drum and are mounted beside each other at the same distance from the periphery of the drum.

11. The apparatus of claim 9 in which the means for feeding the cut-off portion into position between the rollers comprises a means for delivering said cut-off portion into a peripheral gap in the drum and a fixed stop adapted in cooperation with the peripheral gap to force the said portion, which is propelled on into the said gap, upwards into confinement between the surfaces of the rollers.

12. The apparatus of claim 9 in which the means for cutting the rolled out cylinder comprises two radially projecting knives attached to each end of the drum.

13. The apparatus of claim 9 in which the means for discharging the sized cylinder from the operating position comprises a peripheral gap in the drum permitting the finished cylinder to drop down and be propelled away by the rotation of the drum.

14. The apparatus of claim 9 having a shelf directly above the drum, and rotating knives fixed to opposite sides of the drum and projecting from the periphery thereof and adapted to coact with knives associated with the shelf.

15. The apparatus of claim 9 having means for delivering a cut-off portion of the material into a peripheral gap in the drum, and stop means coacting with the peripheral gap comprising fixed arms having their extremities curved to the radius of the cylinder of plastic material and adapted to operate in a circumferential groove in the periphery of the drum, and having a corresponding clearance groove in the rearmost of the two small rollers.

16. The apparatus of claim 9 having means for feeding a sheet of wrapping material to a position between the cylinder and one of the confining rollers for the purpose of wrapping the cylinder by rotation of the rollers.

17. The apparatus of claim 9 having means for feeding a sheet of wrapping material to a position between the cylinder and one of the confining rollers and crimping means mounted on the periphery of the drum for the purpose of closing in the ends of the wrapping material as the cylinder is wrapped by rotation of the rollers.

18. The apparatus of claim 9 having means for feeding a sheet of wrapping material to a position between the cylinder and one of the confining rollers, crimping means for closing in the ends of the wrapping material and means for tapping the ends of the cylinder after the ends of the wrapping material have been folded.

19. The apparatus of claim 9 having means for feeding a sheet of wrapping material to a position between the cylinder and one of the confining rollers, a crimping device mounted on the periphery of the drum for closing in the ends of the wrapping material, means for tapping the ends of the cylinder after the ends of the wrapping material have been folded, said tapping means comprising a pair of tappers arranged in opposing relationship on opposite sides of the drum and adapted to operate on the ends of the wrapped cylinder while it is held between the drum and the smaller rollers.

20. The apparatus of claim 9 having means for rotating the drum and the smaller rollers at constant speeds, and means for maintaining the peripheral speeds of the rollers at the same or greater speed than the peripheral speed of the drum.

21. An apparatus for forming cylindrical articles of plastic material, having a rotatable drum and a plurality of rollers parallel thereto to permit an article to be brought between the drum and the rollers to be formed in a sheet of wrapping material, said rollers having, when at work, a fixed position with respect to the drum, said drum having a set of peripheral and longitudinal depressions therein, a stop on the drum, one of the depressions being adapted to lag and follow with respect to the direction of rotation of the drum and having arresting means for the article, said depression having sufficient depth that an article lying therein is out of contact with the first roller but abuts against the stop on the drum and the other depression has sufficient depth that an article lying therein is free of said stop.

22. An apparatus for forming cylindrical articles of plastic material, having a rotatable drum and a plurality of rollers parallel thereto to permit an article to be brought between the drum and the rollers to be formed in a sheet of wrapping material, said rollers having, when at work, a fixed position with respect to the drum, said drum having a set of peripheral and longitudinal depressions therein, means projecting from about the periphery of the drum and capable of being brought into operation as the drum rotates.

23. The apparatus of claim 21 in which the stop is situated in a peripheral groove of the drum.

24. The apparatus of claim 21 in which the stop is shaped to conform to the curvature of the cylindrical article.

25. The apparatus of claim 21 having grooves in the drum and roller to accommodate the stop.

ALBERTUS HENDRIK HAUPT.